US012671079B1

(12) United States Patent
Zhou et al.

(10) Patent No.: US 12,671,079 B1
(45) Date of Patent: Jun. 30, 2026

(54) ACTIVE MATERIALS COMPRISING SECONDARY ACTIVE-MATERIAL STRUCTURES FOR HIGH RATE BATTERY APPLICATIONS AND METHODS OF FABRICATING SUCH ACTIVE MATERIALS

(71) Applicant: Clyra Inc., Dover, DE (US)

(72) Inventors: Sa Zhou, Fremont, CA (US); Song Han, Foster City, CA (US)

(73) Assignee: Clyra Inc., Dover, DE (US)

( * ) Notice: Subject to any disclaimer, the term of this patent is extended or adjusted under 35 U.S.C. 154(b) by 966 days.

(21) Appl. No.: 17/645,708

(22) Filed: Dec. 22, 2021

(51) Int. Cl.
 *H01M 4/36* (2006.01)
 *H01M 4/02* (2006.01)
 (Continued)

(52) U.S. Cl.
 CPC ......... *H01M 4/364* (2013.01); *H01M 4/0428* (2013.01); *H01M 4/133* (2013.01);
 (Continued)

(58) Field of Classification Search
 CPC ...... H01M 4/362; H01M 4/133; H01M 4/134; H01M 4/1393; H01M 4/38; H01M 4/386;
 (Continued)

(56) References Cited

U.S. PATENT DOCUMENTS

2009/0169994 A1* 7/2009 Mah ...................... H01M 4/483
                                                                      429/218.1
2014/0308585 A1* 10/2014 Han ...................... H01M 4/362
                                                                      429/231.8

(Continued)

FOREIGN PATENT DOCUMENTS

CN          103682287 A      3/2014

OTHER PUBLICATIONS

Quan Xu, Jin-Yi Li, Jian-Kun Sun, Ya-Xia Yin, Li-Jun Wan, Yu-Guo Guo, Watermelon-Inspired Si/C Microspheres with Hierarchical Buffer Structures for Densely Compacted Lithium-Ion Battery Anodes, Advanced Energy Materials, 17, 1601481. (Year: 2017).*

(Continued)

*Primary Examiner* — Basia A Ridley
*Assistant Examiner* — Julia Marie Fehr
(74) *Attorney, Agent, or Firm* — Polygon IP, LLP

(57) ABSTRACT

Described herein are active materials for use in negative electrodes of lithium-ion electrochemical cells as well methods of forming such active materials. In some examples, an active material comprises secondary active-material structures, each formed by physical or chemical attachment of multiple primary active-material structures. These primary active-material structures can comprise one of silicon, silicon oxide, tin, tin oxides, germanium, metal, and silicide, and each structure can have a size of between 5 nanometers and 30 micrometers. The small size of the primary active-material structures helps to maintain the mechanical stability of these structures as well as of the secondary active-material structures during battery cycling. Furthermore, these specific arrangements of the primary active-material structures support high charge-discharge rates. Some of the secondary active-material structures can be joined with other such structures, e.g., forming a network of the structures. An active material can be a powder and incorporated into slurries.

17 Claims, 8 Drawing Sheets

(51) Int. Cl.

| | |
|---|---|
| *H01M 4/04* | (2006.01) |
| *H01M 4/133* | (2010.01) |
| *H01M 4/134* | (2010.01) |
| *H01M 4/139* | (2010.01) |
| *H01M 4/1393* | (2010.01) |
| *H01M 4/1395* | (2010.01) |
| *H01M 4/38* | (2006.01) |
| *H01M 4/48* | (2010.01) |
| *H01M 4/58* | (2010.01) |
| *H01M 4/62* | (2006.01) |

(52) U.S. Cl.
CPC ........... *H01M 4/134* (2013.01); *H01M 4/139* (2013.01); *H01M 4/1393* (2013.01); *H01M 4/1395* (2013.01); *H01M 4/38* (2013.01); *H01M 4/386* (2013.01); *H01M 4/387* (2013.01); *H01M 4/483* (2013.01); *H01M 4/58* (2013.01); *H01M 4/621* (2013.01); *H01M 4/625* (2013.01); *H01M 2004/027* (2013.01)

(58) Field of Classification Search
CPC ........... H01M 2004/027; H01M 4/364; H01M 4/366; H01M 4/583; H01M 4/0428; H01M 4/139; H01M 4/1395; H01M 4/387; H01M 4/483; H01M 4/58; H01M 4/621; H01M 4/625
See application file for complete search history.

(56) References Cited

U.S. PATENT DOCUMENTS

| | | | |
|---|---|---|---|
| 2014/0370380 A9* | 12/2014 | Cui | H01M 4/1395 |
| | | | 977/948 |
| 2017/0092946 A1* | 3/2017 | Mattis | H01M 4/62 |
| 2017/0194638 A1* | 7/2017 | Cho | H01M 10/0525 |
| 2019/0181434 A1* | 6/2019 | Lee | H01M 10/0567 |

OTHER PUBLICATIONS

Xu, Q.; Li, J.-Y.; Sun, J.-K.; Yin, Y.-X.; Wan, L.-J.; Guo, Y.-G. Watermelon-Inspired Si/C Microspheres with Hierarchical Buffer Structures for Densely Compacted Lithium-Ion Battery Anodes, Adv. Energy Mater., 7, 1601481, published online Feb. 8, 2017. (Year: 2017).*

Minseong Ko, et al., "Scalable synthesis of silicon-nanolayer-embedded graphite for high-energy lithium-ion batteries" Nat Energy 1, 16113 (2016).

Quan Xu, "Watermelon-Inspired Si/C Microspheres with Hierarchical Buffer Structures for Densely Compacted Lithium-Ion Battery Anodes" Adv. Energy Mater. 2016, 1601481.

Xiaohui Gong, et al., "Yolk-shell silicon/carbon composites prepared from aluminum-silicon alloy as anode materials for lithium-ion batteries" Ionics (2021) 27:1939-1948.

* cited by examiner

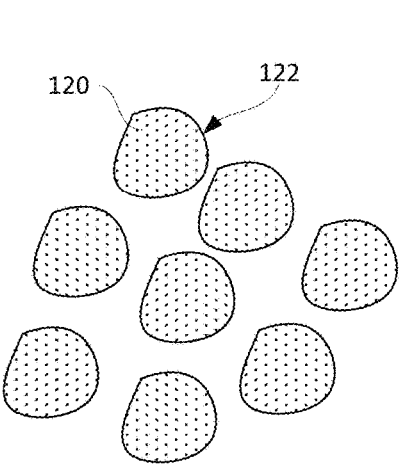
FIG. 1A
FIG. 1B
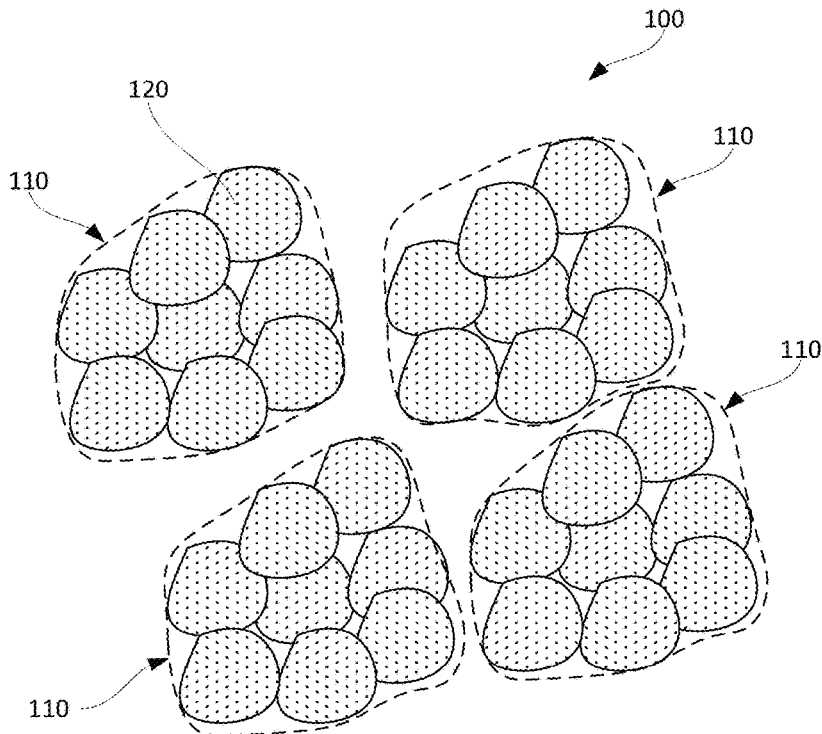
FIG. 1C

300

Mix primary active-material structures and attachment entities 302

Press slurry into pellets and dry pellets. 304

Break down pellets into secondary active-material structures 306

320

Dispense particles in solution 322

Spray-dry slurry thereby forming intermediate structure 324

Anneal intermediate structure 326

ACTIVE MATERIALS COMPRISING SECONDARY ACTIVE-MATERIAL STRUCTURES FOR HIGH RATE BATTERY APPLICATIONS AND METHODS OF FABRICATING SUCH ACTIVE MATERIALS

BACKGROUND

High-capacity materials, such as silicon, are very desirable for various battery applications because of their high gravimetric and volumetric capacities. However, many high-capacity materials undergo significant volume changes during charge-discharge cycling (e.g., incorporation-removal of lithium ions). The repeated cycling and corresponding volume changes can cause pulverization of these materials and/or loss of electrical connections between these materials and other electrode components. Conventional integration of high-capacity materials into electrodes typically results in high irreversible capacity losses, excessive solid-electrolyte-interface (SEI) formation, and losses of electrical contacts within electrodes formed from these materials, all of which are highly undesirable. These issues have limited the application of high-capacity active materials in batteries.

Different solutions have been proposed to address these high-capacity material integration issues. For example, reducing the size of high-capacity structures tends to reduce the stress within the structures during the volume changes and improves the intrinsic mechanical stability. However, supporting and interconnecting many small structures presents new challenges. In addition, the high surface area of small particles results in high consumption of availability lithium and electrolyte for SE1 formation.

What is needed are active materials capable of supporting high charge-discharge rates and withstanding repeated charge-discharge cycling while maintaining the integrity and performance of the electrodes.

SUMMARY

Described herein are active materials for use in negative electrodes of lithium-ion electrochemical cells as well methods of forming such active materials. In some examples, an active material comprises secondary active-material structures, each formed by physical or chemical attachment of multiple primary active-material structures. These primary active-material structures can comprise one of silicon, silicon oxide, tin, tin oxides, germanium, metal, and silicide, and each structure can have a size of between 5 nanometers and 30 micrometers. The small size of the primary active-material structures helps to maintain the mechanical stability of these structures as well as of the secondary active-material structures during battery cycling. Furthermore, this small size helps to reduce the charge transfer path and to short the charge time. At the same time, combining small primary active-material structures into secondary active-material structures reduces the overall surface area of the resulting structures. As such, secondary active-material structures tend to consume less available lithium to form an SE1 layer and also tend to be structurally more stable. Furthermore, these specific arrangements of the primary active-material structures support high charge-discharge rates. Some of the secondary active-material structures can be joined with other such structures, e.g., forming a network of the structures. An active material can be provided as a powder and can be incorporated into slurries.

BRIEF DESCRIPTION OF THE DRAWINGS

FIG. 1A is a schematic representation of primary active-material structures as disjoined structures, in accordance with some examples.

FIG. 1B is a schematic representation of a secondary active-material structure formed by physical or chemical attachment of multiple primary active-material structures, in accordance with some examples.

FIG. 1C is a schematic representation of an active material example comprising secondary active-material structures, each formed by physical or chemical attachment of multiple primary active-material structures.

DETAILED DESCRIPTION

In the following description, numerous specific details are outlined to provide a thorough understanding of the present invention. The present invention may be practiced without some or all of these specific details. In other instances, well-known process operations have not been described in detail to avoid obscuring the present invention. While the invention will be described in conjunction with the specific examples, it will be understood that it is not intended to limit the invention to the examples.

Active Material Examples

As noted above, high-capacity active materials tend to experience significant volume changes during lithiation cycles. At large scales and if not controlled, these volume changes can pulverize active-material structures and disrupt electronic pathways within the electrode layers. Combining small primary active-material structures into secondary active-material structures helps to address this and other issues associated with high-capacity active materials and other active materials in lithium-ion electrochemical cells.

Using smaller disjoined particles as, e.g., is schematically shown in FIG. 1A, formed from high-capacity active materials, can present various challenges. One challenge involves a much larger surface area associated with smaller disjoined particles. For example, FIG. 1A illustrates multiple primary active-material structures 120 in a disjoined form with surface 122 of each primary active-material structure 120 being accessible and exposed. By way of an example, a sphere has a ratio of the surface area ($4\pi r^2$) to the volume ($4/3\pi r^3$) of 3/r. As such, the surface area increases inverse proportionally to the particle size (for a given amount of the material) for active material structures having sphere-like shapes. Additional surface area is not desirable as it causes the excessive formation of solid electrolyte interface (SEI), which traps lithium and has other negative effects. While SE1 formation is unavoidable, it should be kept to a minimum.

Furthermore, forming electrical connections among many small particles can be challenging and typically requires significant amounts of conductive additives, which negatively impact the capacity. Another issue with many small particles involves a need for excess binder materials to keep these particles together in an active material layer and attached to a current collector. This additional binder adds to the total cell weight effectively reducing the cell's gravimetric capacity.

Figure 1D:
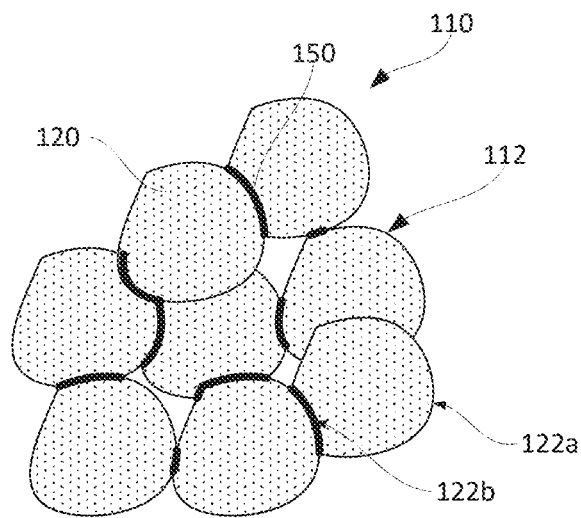
FIG. 1D is a schematic representation of another example of a secondary active-material structure comprising attachment entities providing the physical or chemical attachment of the primary active-material structures.

Various issues listed above are addressed by integrating multiple primary active-material structures into larger secondary active-material structures as will now be described with reference to FIGS. 1B-1E. Specifically, FIG. 1B is a schematic representation of secondary active-material structure 110 formed by the physical or chemical attachment of multiple primary active-material structures 120 to each other. Unlike the example in FIG. 1A showing primary active-material structures 120 is a disjoined form, primary active-material structures 120 in FIG. 1B are joined together into one agglomerate that is referred to as secondary active-material structure 110. Because of this agglomeration, the surface of secondary active-material structure 110 is significantly smaller than, e.g., the combined surface of individual primary active-material structures 120 (in a disjoined form). Specifically, surface 112 of secondary active-material structure 110 is formed only by exposed surface portions 122a of primary active-material structures 120. In other words, these exposed surface portions 122a are not in contact with other primary active-material structures 120 or other components. The agglomeration also creates unexposed surface portions 122b of primary active-material structures 120, which are covered and sealed from the environment by other primary active-material structures 120 as, e.g., is schematically shown in FIG. 1B.

In some examples, the surface area of each secondary active-material structure 110 is less than a combined surface area of individual primary active-material structures 120, forming this secondary active-material structures 110, by at least 5% or, more specifically, by at least 15% or even by at least 30%. In other words, the same amount of active material (which defines the capacity) has a smaller exposed surface area resulting in less SE1 formation and less electrolyte decomposition (e.g., various undesirable side reactions during cycling). It should be noted that while the smaller surface is beneficial from the SE1 formation and other perspectives, secondary active-material structure 110 also provides short charge-transfer paths due to the integration of primary active-material structures 120. In other words, the charge path provided by primary active-material structures 120 is not increased during the integration process. Overall, the surface area of secondary active-material structures 110 is between the combined surface area of individual primary active-material structures 120 and the surface area of hypothetical solid particles having the same overall size as secondary active-material structures 110.

Figure 1E:
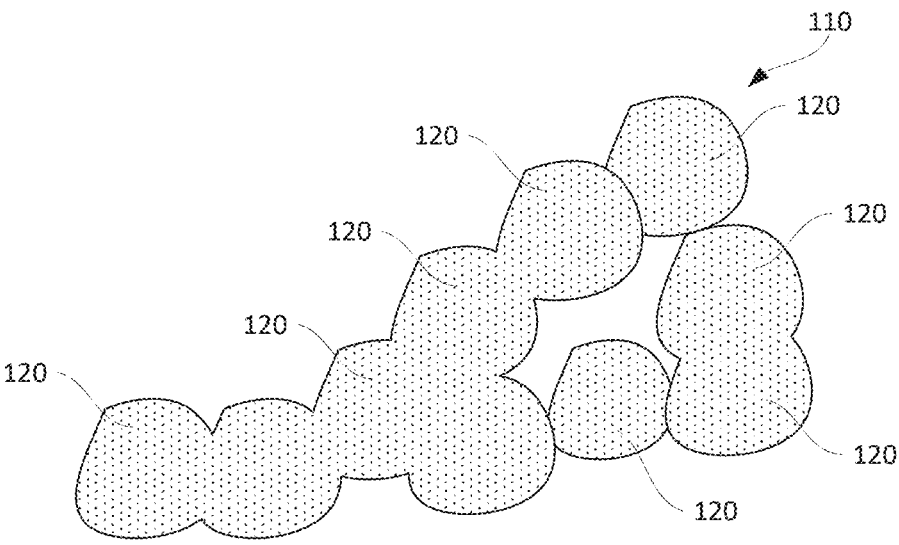
FIG. 1E is a schematic representation of yet another example of a secondary active-material structure in which primary active-material structures are partially joined.

As noted above, secondary active-material structure 110 is formed by the physical or chemical attachment of multiple primary active-material structures 120. Some examples of this attachment include alloying (e.g., metal alloying), polymer binding, adhesive-agent binding, mechanical compression at high pressures. In some examples, primary active-material structures 120 are partially joined together as, e.g., is schematically shown in FIG. 1E. Furthermore, this form of attachment should be distinguished from particles bound in an electrode layer (e.g., provided by a polymer binder in the electrode layer).

In some examples, the physical or chemical attachment is provided by direct contact between adjacent primary active-material structures 120, e.g., without any intermediate structures. For example, secondary active-material structures 110 are formed right away during the initial synthesis of primary active-material structures 120 or by mechanically compressing primary active-material structures 120 followed by the high-temperature treatment to partially fuse primary active-material structures 120 as, e.g., is schematically shown in FIG. 1E.

Alternatively, attachment entities 150 can be used between each pair of attached primary active-material structures 110 as, e.g., is schematically shown in FIG. 1D. In other words, active material 100 further comprise attachment entities 150, providing the physical or chemical attachment of multiple primary active-material structures 120. Attachment entities 150 and primary active-material structures 120 have different compositions. For example, attachment entities 150 can comprise carbon or metal (e.g., titanium iron, nickel), while primary active-material structures 120 can comprise silicon. For example, a mixture of attachment entities 150 and primary active-material structures 120 can be heat treated to bind the two materials (e.g., form a metal silicide when primary active-material structures 120 are silicon structures while attachment entities 150 are metal structures). In other examples, attachment entities 150 and primary active-material structures 120 are interconnected through alloying. It should be noted that attachment entities 150 are optional and, in some examples, secondary active-material structures 110 are formed without any attachment entities 150, e.g., by direct contact between primary active-material structures 120 as described above.

In some examples, each primary active-material structure 120 has a size of between 5 nanometers and 30 micrometers or, more specifically, between 1 nanometer and 1 micrometer. For comparison, conventionally-used particles of high-capacity active materials are micrometers in size. Because of a much smaller size of primary active-material structures 120, primary active-material structures 120 (and, as a result, secondary active-material structures 110) exhibit good mechanical stability during lithiation cycles. Specifically, the stress exhibited during swelling and contractions of each primary active-material structure 120 is proportional to the size and is smaller for smaller structures. As such, the smaller size of primary active-material structure 120 helps with preserving the mechanical integrity of each primary active-material structure 120 and also the attachments between primary active-material structures 120. Thereby, the integrity of each secondary active-material structure 110. It should be noted that secondary active-material structure 110 can be much larger than primary active-material structures 120, e.g., at least three times larger, at least five times larger, or even at least 10 times larger. For example, each secondary active-material structure 110 can have an average size greater than 1 micrometer or, more specifically, greater than 5 micrometers, such as greater than 10 micrometers. A larger size of secondary active-material structures 110 simplifies handing and further integration of secondary active-material structures 110 into an electrode layer (without sacrificing the integrity of secondary active-material structures 110). For example, integrating multiple primary active-material structures 120 into each secondary active-material structure 110 reduces the reliance on conductive additives and polymers in a resulting negative electrode.

In some examples, secondary active-material structures 110 has a porosity greater than 1% or even greater than 10% or even greater than 20% or even greater than 30%. The porosity provides space for the material (forming secondary active-material structures 110) to expand into without stressing adjacent portions of secondary active-material structures 110. The porosity also increases the surface area of secondary active-material structures 110 providing additional sites for lithium to enter and leave secondary active-material structures 110.

In some examples, primary active-material structures 120 comprise silicon, silicon oxide, tin, tin oxides, germanium, metal, and silicide. Silicon and tin are two examples of high-capacity active materials that help to improve the overall capacity of active material 100. Metals and silicides (e.g., formed by reacting metals with silicon) can help to provide physical and chemical attachments among primary active-material structures 120 and/or to provide charge transfer paths within secondary active-material structures 110. Furthermore, in some examples, primary active-material structures 120 are composite structures comprising two or more of silicon, silicon oxide, tin, tin oxides, germanium, metal, and silicide, and carbon. For example, each primary active-material structure 120 can include a carbon-based core and a shell formed from one or more high-capacity active materials (e.g., silicon and tin). In this example, the surface of secondary active-material structure 110 is formed at least in part by one or more of these high-capacity active materials. Unlike carbon-based materials (e.g., graphite), these high-capacity active materials enable much higher charge and discharge rates. For example, silicon has a higher lithiation potential (than graphite) thereby reducing the risk of lithium plating on the surface of secondary active-material structure 110, when silicon is forming this surface. Furthermore, graphite has directional limitations for lithium to enter and leave graphite structures. These directional limitations are caused by the layered structure of graphite. On the other hand, silicon receives lithium by alloying with lithium and does not have such directional limitations. In some examples, the portion of the total surface of secondary active-material structure 110 that is formed by one or more high-capacity active materials is at least about 10%, at least about 30%, or even at least about 50%. In more specific examples, the entire surface of secondary active-material structure 110 is formed by one or more high-capacity active materials.

FIG. 1C is a schematic representation of active material 100 for use in negative electrodes of lithium-ion electrochemical cells, in accordance with some examples. Various aspects of negative electrodes and lithium-ion electrochemical cells are described below with reference to FIGS. 4A and 4B. For example, active material 100 can be integrated into an active material layer of the negative electrode and supported in this layer by a polymer binder. This polymer binder should be distinguished from internal components of active material 100, such as adhesive entities used to attache multiple primary active-material structures 120 to form each secondary active-material structure 110 and interconnecting components used to join multiple secondary active-material structures 110. In fact, prior to the integration of active material 100 into an electrode layer, active material 100 can be in powder form or in slurry form (e.g., powder mixed with a solvent). For example, active material 100 that are in powder can be later mixed into slurry or used for dry electrode coating.

Figure 2A:
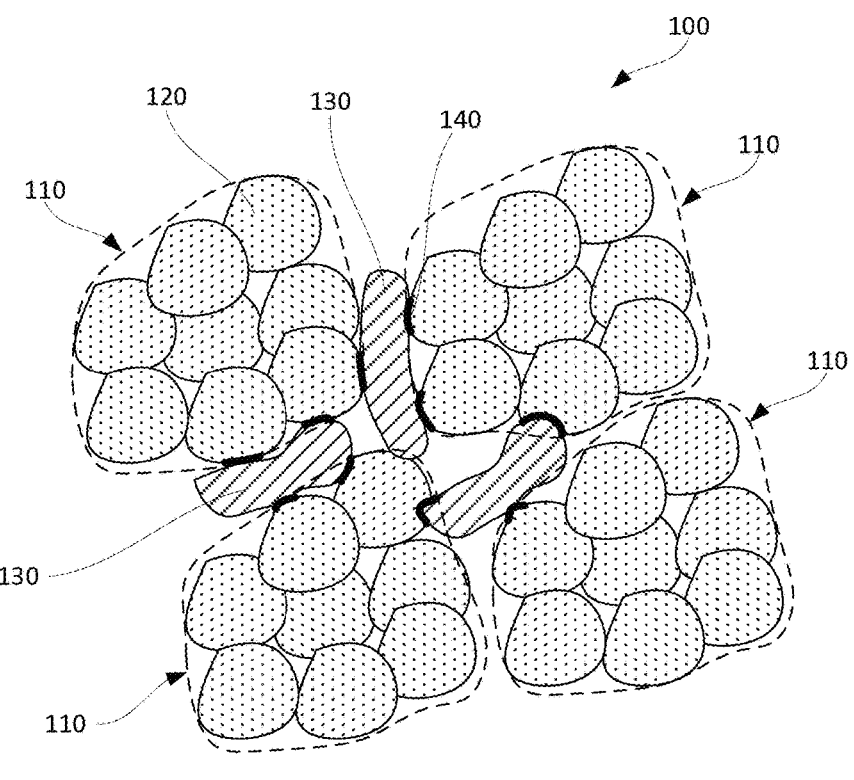
FIGS. 2A-2D are schematic representations of different examples of active materials comprising secondary active-material structures and interconnecting structures, extending among and supporting the secondary active-material structures.
Figure 2B:
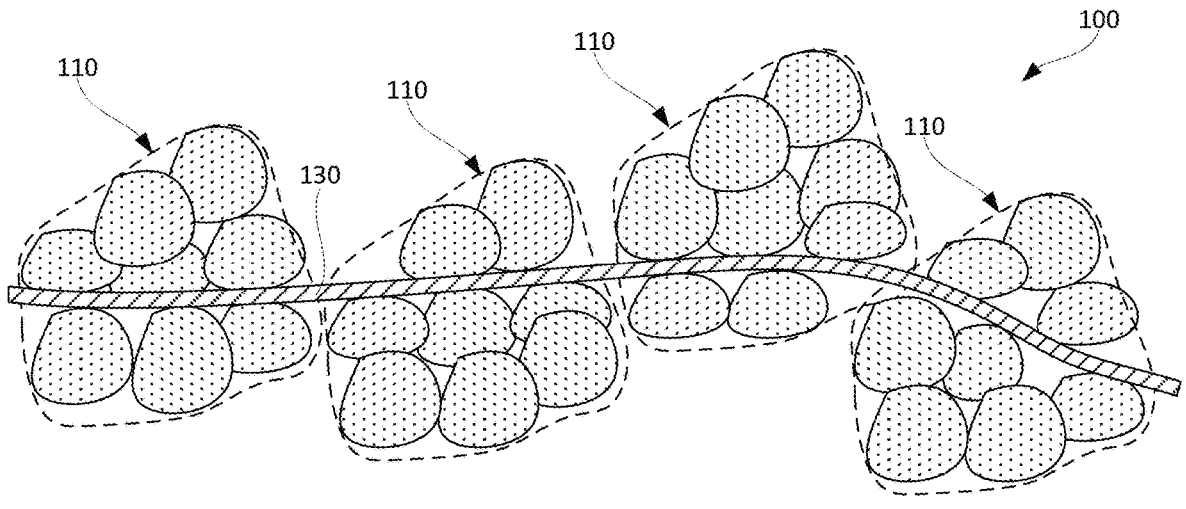

Referring to the example in FIG. 1C, each secondary active-material structure 110 can be a separate structure, disjoined from other secondary active-material structures 110. Alternatively, multiple secondary active-material structures 110 can be joined together to form a local network of secondary active-material structures 110. Referring to FIGS. 2A-2B, in some examples, active material 100 further comprises interconnecting structures 130. Each of interconnecting structures 130 is connected to two or more secondary active-material structures 110 forming an interconnected network.

Interconnecting structures 130 provides electronic conductivity among multiple secondary active-material structures 110, attached to these interconnecting structures 130. For example, secondary active-material structures 110 can be formed from materials having low electronic conductivity, such as silicon (which has a conductivity of between $10^{-2}$ to $10~\Omega^{-1}\text{-cm}^{-1}$). Interconnecting structures 130 can be formed from electronically conductive materials. In some examples, interconnecting structures 130 comprises one or more carbon, silicide, metal, and a metal alloy. The addition of interconnecting structures 130 makes the entire structure more stable and ensures electronic connections to secondary active-material structures 110, e.g., when secondary active-material structures 110 become separated from each other and may not have direct contact/electronic path. For example, 1-D carbon structures (e.g., carbon nanotubes, carbon fibers, carbon nanowires) and 2-D carbon structures (e.g., graphene, conductive graphite) have a wrapping effect, when used as interconnecting structures 130. In other words, such interconnecting structures 130 wraps around secondary active-material structures 110 and secondary active-material structures 11 have a much lower chance to lose the electrical connection to other electrode components.

Figure 2C:
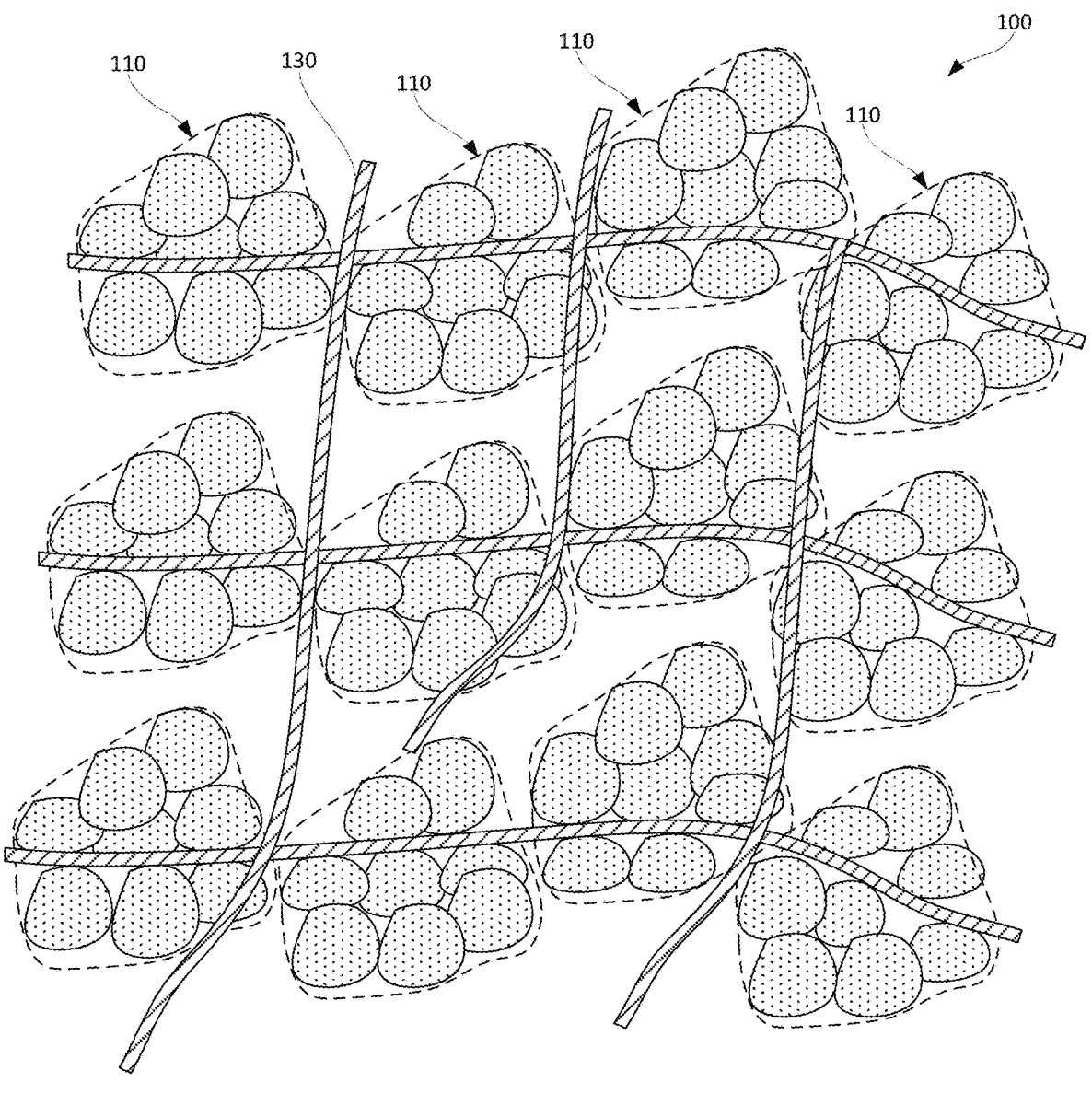
Figure 2D:
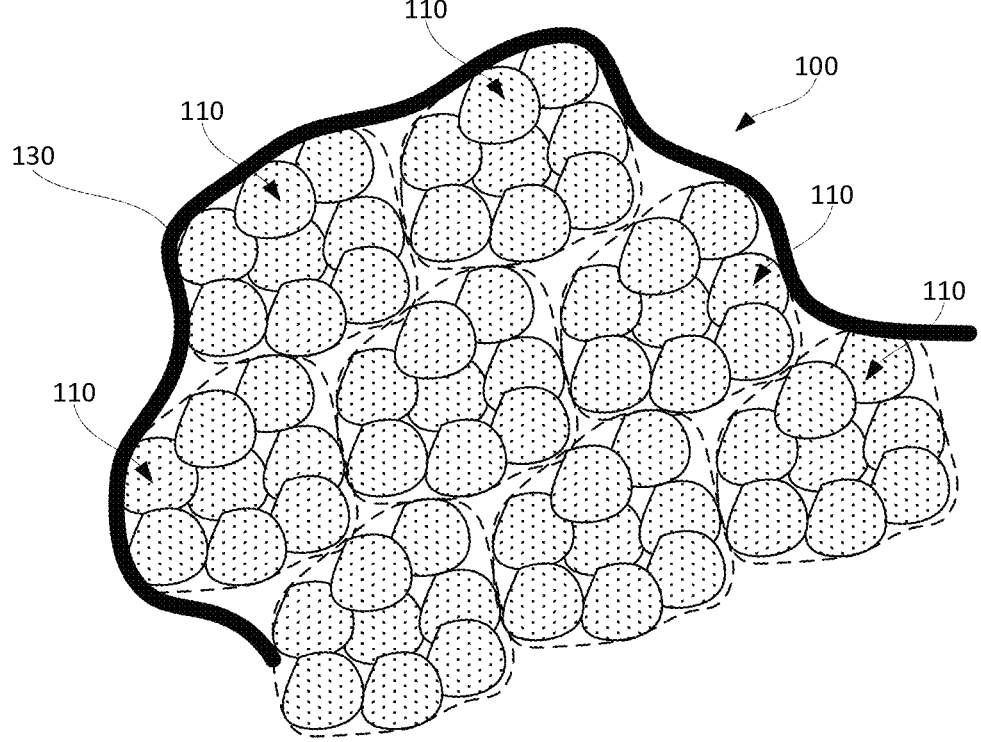

In some examples, interconnecting structures 130 have a shape of 0-D structures (e.g., particles), 1-D structures (e.g., wires, rods), 2-D structures (e.g., flakes, plates), or 3-D networks. FIG. 2A illustrates an example in which interconnecting structures 130 are 0-D structures. For example, 0-D structures have a small size, e.g., 10 nanometers to 100 nanometers, such as Super P. Such structures are very efficient in filling void spaces to ensure better conductivity. FIG. 2B illustrates an example in which interconnecting structures 130 are 1-D structures, which can ensure the mechanically integrating and connection of secondary active-material structures 110. FIG. 2C illustrates an example in which interconnecting structures 130 are 2-D structures or 3-D structures, which provide wrapping and integrate secondary active-material structures 110, forming a conductive network and mechanical network. FIG. 2D illustrates yet another example in which interconnecting structure 130 is a 2-D film, wrapping around a cluster of secondary active-material structures 110, forming a conductive network and mechanical network.

In some examples, interconnecting structures 130 (e.g., adhesive entities) are physically or chemically attached to an exterior of at least some of secondary active-material structures 110. For example, interconnecting structures 130 can be attached to secondary active-material structures 110 using adhesive entities 140, bound to both interconnecting structures 130 and secondary active-material structures 110 as, e.g., is schematically shown in FIG. 2A. For example, each of interconnecting structures 130 comprises both hydrophilic functional groups and hydrophobic functional groups. In some examples, interconnecting structures 130 comprises one or more of sodium dodecyl sulfate, sodium stearate, octaethylene glycol monododecyl ether, abietic acid, benzalkonium chloride, cetrimonium bromide, cetrimonium chloride, cetrimonium hexafluorophosphate, aluminum isopropoxide, decyltrimethoxysilane, Perfluorooctanesulfonic acid, lignosulfonates, titanium triisostearoylisopropoxide, Isopropoxyaluminum distearate, octylphenoxypolyethoxyethanol, or 2-[4-2,4,4-trimethylpentan-2-ylphenoxy]ethanol.

Referring to FIG. 2B, in some examples, interconnecting structures 130 extend inside at least some of secondary active-material structures 110, which forms a mechanical and electrical network. For example, interconnecting structures 130 can be added during the synthesis of secondary active-material structures 110 as described above (e.g., heat treating a mixture of silicon and metal structures to form silicide interfaces). In another example, a structure in FIG. 2B is formed by electrospinning primary active-material structures 120 with interconnecting structures 130 or by spray-drying primary active-material structures 120 with interconnecting structures 130.

Method Examples

Various examples of forming active material 100 are within the scope. For example, active material 100 can be formed by dry-mixing of silicon particles and graphene particles. The mixture is then pressed into pellets using a pressure up to 100 Mpa pressure. The pellets are broken down into secondary active-material structures 110 using, e.g., ball milling or jet milling. In this example, silicon particles are operable as primary active-material structures 120, while graphene particles are used for attaching the silicon particles (e.g., used as attachment entities 150).

Figure 3A:
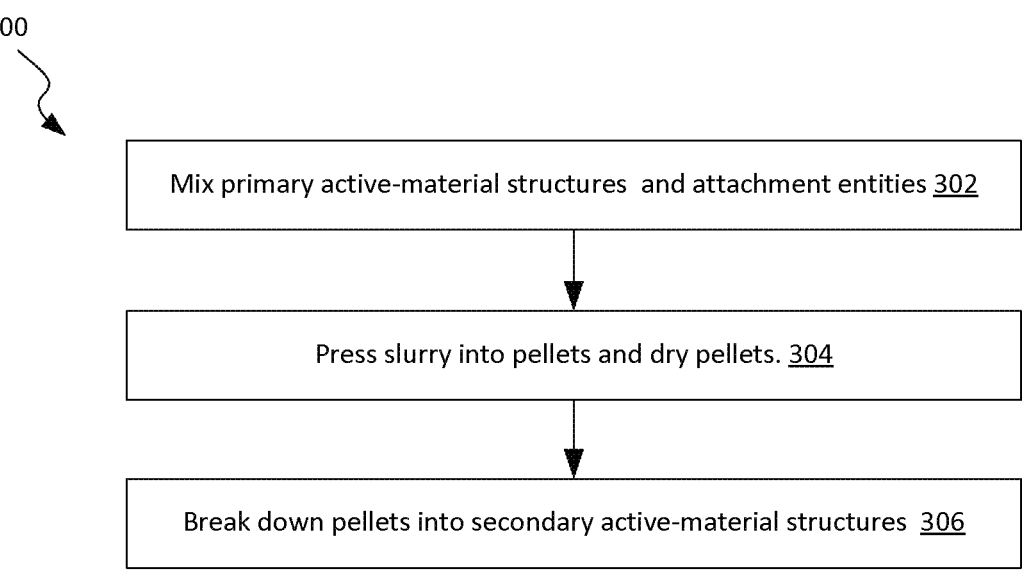
FIGS. 3A and 3B are process flowcharts corresponding to different examples of fabricating active materials.

Another example of fabricating active material 100 is illustrated in FIG. 3A. Specifically, method 300 of forming active material 100 may commence with (block 302) mixing primary active-material structures 120 (e.g., silicon particles and/or graphene particles) and attachment entities (e.g., CMC) together with a solvent (e.g., water) to form a slurry. Method 300 proceed with (block 304) pressing the slurry into pellets and drying the pellets. For example, the slurry is then pressed (e.g., using a pressure up to 100 MPa) and dried (e.g., using a temperature up to 100° C.). Method 300 proceed with (block 306) breaking down the pellets into secondary active-material structures 110, e.g., using ball milling or jet milling.

In another example, silicon structures are electrochemically plated on carbon nanotubes and/or nanofibers. For example, carbon nanotubes and/or nanofibers are placed in a plating solution, comprising a silicon-containing precursor, proximate to a working electrode. Upon applying a deposition voltage to the working electrode, the silicon-containing precursor decomposes and forms a layer of silicon on the carbon nanotubes and/or nanofibers. In some instances, these layers (grown on two adjacent structures overlap) join together, physically and chemically attaching multiple primary active-material structures (silicon-carbon composites) and form secondary active-material structures.

Additional fabrication examples include chemical vapor deposition (CVD) and electrospinning. For example, electrospinning can use a slurry formed from primary active-material structures 120, interconnecting structures 130, and (optionally) attachment entities 150, followed by annealing.

Additional fabrication examples include fluidized bed reactors with graphite or carbon nanotubes/nanofibers used as seed particles for silicon deposition to form secondary active-material structures 110 or even a network of secondary active-material structures 110. In some examples, partially joined primary silicon particles are collected in the fluidized bed reactor exhaust.

Figure 3B:
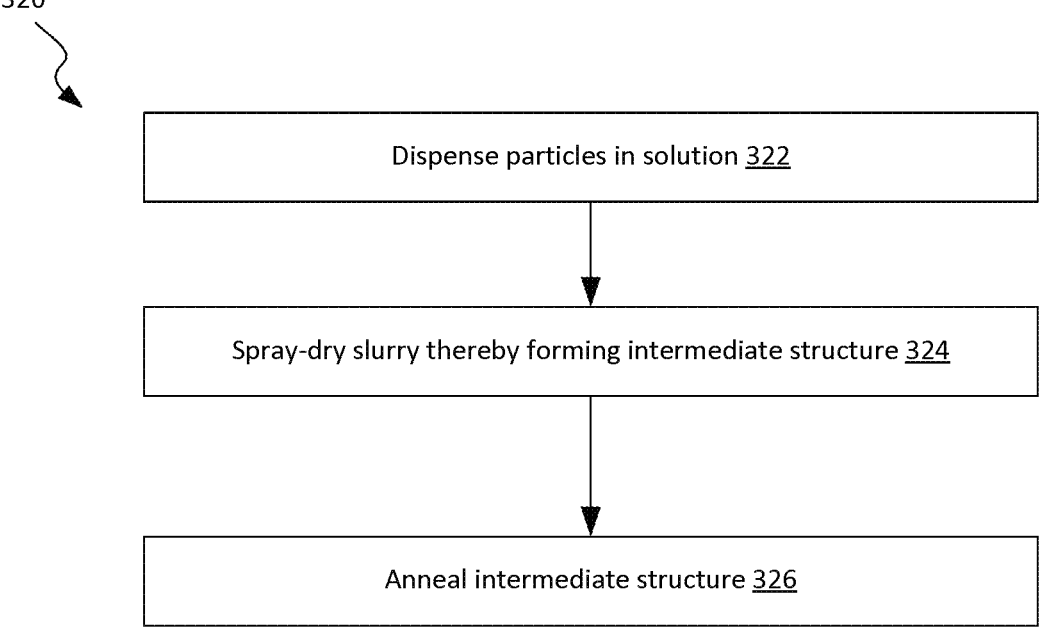

FIG. 3B illustrates another example of fabricating active material 100. Method 320 may commence with (block 322) dispensing silicon particles and carbon black particles in a glucose solution thereby forming a slurry. Method 320 proceed with (block 324) spray-drying the slurry thereby forming an intermediate structure. Method 320 proceed with (block 326) annealing the intermediate structure, e.g, at a temperature of greater than 600° C. or even greater than 800° C. This annealing carbonizes glucose and the remaining carbon bonds adjacent structures.

In some examples, silicon particles and metal particles are balled milled together, followed by annealing. Silicide forms during heating and adheres particles together. Additional conductive agents, such as graphene, conductive graphite, could be added.

Examples of Electrode and Electrochemical Cells/Applications

Figure 4A:
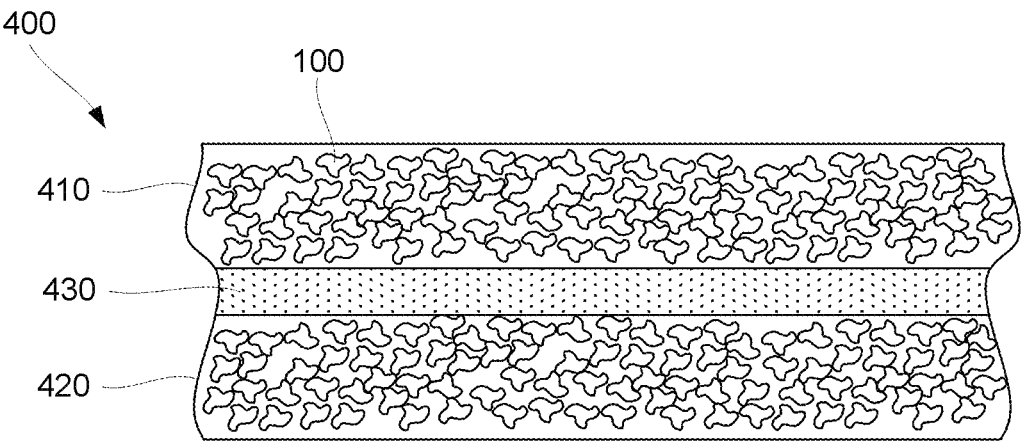
FIG. 4A is a schematic cross-sectional view of a negative electrode comprising an active material, comprising secondary active-material structures, each formed by physical or chemical attachment of multiple primary active-material structures.

In some examples, active material 100 that is described above (e.g., comprising secondary active-material structures 110, each formed by physical or chemical attachment of multiple primary active-material structures 120) is used in electrodes of lithium-ion batteries or, more specifically, in negative electrodes of lithium-ion batteries. FIG. 4A is a schematic illustration of electrode 400, comprising current collector 430, first active layer 410, and, optionally, second active layer 420. In this example, the first active layer 410 and second active layer 420 are supported by current collector 430, which also provides electric communication between first active layer 410 and second active layer 420 and other components of the cell.

One or both first active layer 410 and second active layer 420 may comprise active material 100. Active material 100 are configured to receive and release ions during the cycling of the electrochemical cell. First active layer 410 and second active layer 420 can also comprise other active materials and/or non-active materials, such as conductive additives (e.g., Carbon Black, Super P) and a binder.

Figure 4B:
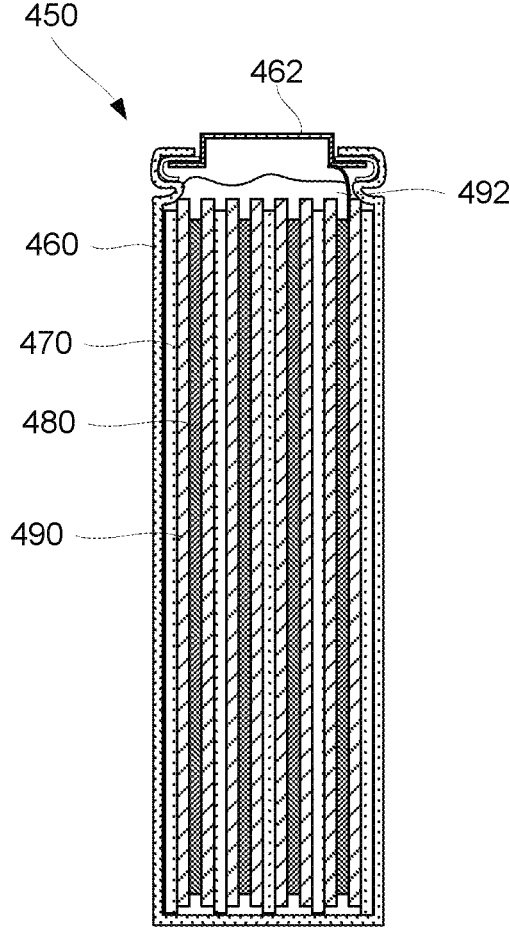
FIG. 4B is a schematic cross-sectional view of a battery cell formed using the negative electrode of FIG. 4A.

FIG. 4B is a schematic illustration of electrochemical cell 450, comprising first electrode 470, second electrode 480, and separator 490 arranged in a stack, wound jelly-roll, or any form. First electrode 470, second electrode 480, or both may include electroplated active material structures as described with reference to FIG. 4A above. Separator 490 is disposed between first electrode 470 and second electrode 480 to prevent direct contact between first electrode 470 and second electrode 480 yet allows ionic communication between these electrodes. Specifically, separator 490 may include pores allowing ions to pass. Electrochemical cell 450 also includes electrolyte 492, which operates as a carrier of ions during the cycling of electrochemical cell 450. First electrode 470, second electrode 480, and other components of the cell may be enclosed and separated from the environment by case 460 and lid 462. In some examples, case 460 and/or lid 462 may operate as terminals of electrochemical cell 450, in which case current collectors of first electrode 470 and/or second electrode 480 may be connected to case 460 and/or lid 462. Some examples of electrochemical cell 450 include, but are not limited to, lithium-ion batteries, lithium polymer batteries, lithium-air batteries, lithium sulfite batteries, lithium metal batteries, solid-state batteries, supercapacitors, and the like.

Experimental Results

Various tests were conducted to evaluate the performance of active materials comprising secondary active-material structures. The tests were conducted using full battery cells with positive electrodes comprising nickel-manganese-cobalt (NMC). The negative electrode was formed using secondary particles manufactured with silicon nanoparticles that were joined together.

Figure 5A:
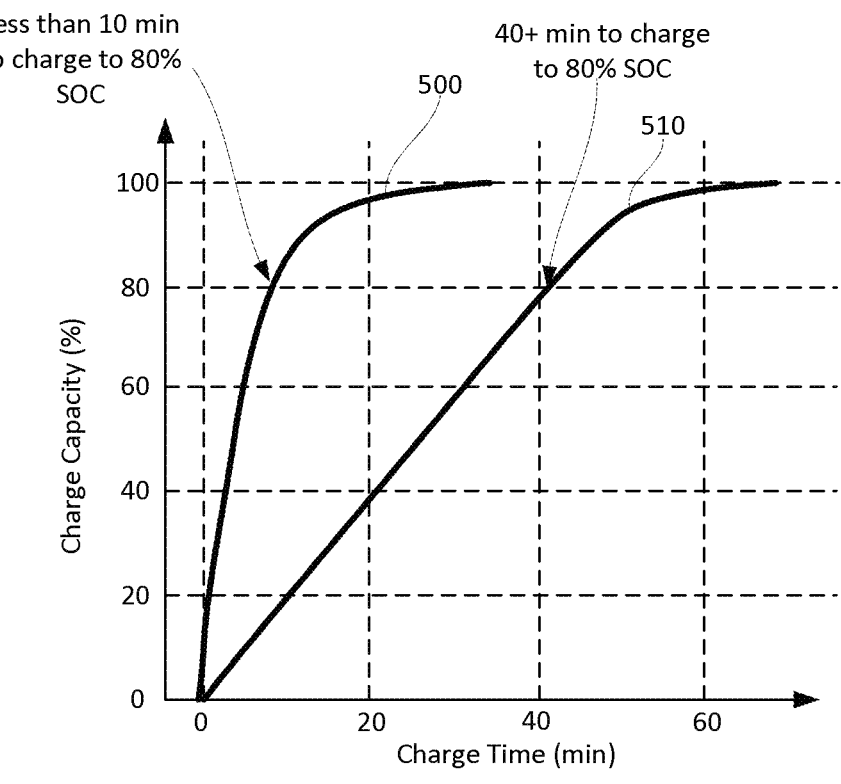
FIG. 5A illustrates two charge capacity profiles as a function of the charge time for two test cells.

FIG. 5A illustrates two charge capacity profiles as a function of time, which are representative of the charge rate capabilities of different cells. Specifically, line 500 corresponds to a cell fabricated with silicon active materials described above. Line 510 corresponds to a convention graphite cell. The silicon-based cell was charged to 80% SOC after less than 10 minutes, while the graphite-based cell took more than 40 minutes to reach the same 80% SOC level. As such, the silicon-based cell can charge at a charge rate that is four times (or more) greater than conventional lithium-ion cells. In some examples, this charge rate (and/or the discharge rate) can be more than 1C or even more than 2C or even more than 10C.

Figure 5B:
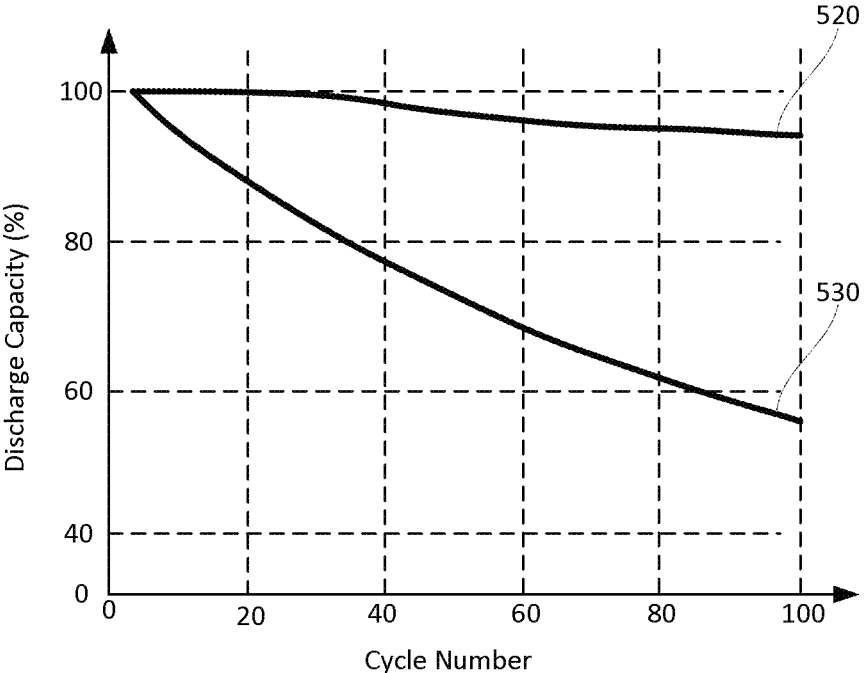
FIG. 5B is a discharge capacity profile over 100 cycles for two test cells.

FIG. 5B illustrates cycling profiles for a silicon-based cell (line 520) and a graphite-based cell (line 530). The silicon-based cell was cycled at a 6C rate, while the graphite-based cell was cycled at a 3C rate. Even though much higher rates were used for the silicon-based cell, this cell still demonstrated much better capacity retention than the graphite-based cell, e.g., almost 95% after 100 cycles for the silicon-based cell vs. 55% for the graphite-based cell.

For purposes of this disclosure, the 1C rate is defined as a current needed to fully charge (from 0% to 100% (SOC) state of charge) or fully discharge (from 100% to 0% SOC) in 1 hour. In other words, a 2C rate represents a current that is 2 times that of the cell's nominal capacity (e.g., a current of 2 kW while the cell's nominal capacity is 1 kWh). Correspondingly, the 2C rate is defined as a current needed to fully charge or discharge in 0.5 hours.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present examples are to be considered illustrative and not restrictive.

What is claimed is:

1. An active material for use in negative electrodes of lithium-ion electrochemical cells, the active material comprising:

secondary active-material structures, each formed by physical or chemical attachment of multiple primary active-material structures using attachment entities, wherein:

each of the primary active-material structures has an average size of between 5 nanometers and 30 micrometers, each of the primary active-material structures has a core-shell structure formed by a core, comprising graphite, and a shell, comprising silicon, the secondary active-material structures are at least 10 times larger than the primary active-material structures, at least some of the secondary active-material structures are disjoined from each other, the attachment entities comprise a metal forming a metal silicide at interfaces with the primary active-material structures, and each of the secondary active-material structures has a porosity greater than 1%.

2. The active material of claim 1, wherein a surface area of each of the secondary active-material structures is less than a combined surface area of individual ones of the multiple primary active-material structures, forming each of the secondary active-material structures, by at least 5%.

3. The active material of claim 1, further comprising interconnecting structures, wherein each of the interconnecting structures is connected to two or more of the secondary active-material structures forming an interconnected network.

4. The active material of claim 3, wherein the interconnecting structures comprises one or more of carbon, silicide, metal, and a metal alloy.

5. The active material of claim 3, wherein the interconnecting structures have a shape of a 3-D network.

6. The active material of claim 3, wherein the interconnecting structures have a shape of a 2-D film wrapping around the secondary active-material structures.

7. The active material of claim 3, wherein the interconnecting structures are physically or chemically attached to an exterior of at least some of the secondary active-material structures.

8. The active material of claim 5, wherein the interconnecting structures extend inside at least some of the secondary active-material structures.

9. The active material of claim 5, wherein:

the interconnecting structures are attached to the secondary active-material structures using adhesive entities, bound to both the interconnecting structures and the secondary active-material structures, each of the adhesive entities comprises both hydrophilic functional groups and hydrophobic functional groups.

10. The active material of claim 9, wherein the adhesive entities comprises one or more of sodium dodecyl sulfate, sodium stearate, octaethylene glycol monododecyl ether, abietic acid, benzalkonium chloride, cetrimonium bromide, cetrimonium chloride, cetrimonium hexafluorophosphate, aluminum isopropoxide, decyltrimethoxysilane, Perfluorooctanesulfonic acid, lignosulfonates, titanium triisosteaaroylisopropoxide, Isopropoxyaluminum distearate, octylphenoxypolyethoxyethanol, or 2-(4-(2,4,4-trimethyl-pentan-2-yl)phenoxy) ethanol.

11. The active material of claim 1, wherein the active material is a powder form or a slurry form.

12. The active material of claim 1, wherein each of the secondary active-material structures has an average size greater than 5 micrometers.

13. The active material of claim 1, wherein each of the secondary active-material structures has a porosity greater than 10%.

14. The active material of claim 1, wherein each of the secondary active-material structures has a porosity greater than 20%.

15. The active material of claim 1, wherein each of the secondary active-material structures has a porosity greater than 30%.

16. The active material of claim 1, wherein a portion of a total surface of the secondary active-material structures formed by silicon is at least about 10%.

17. The active material of claim 1, wherein a portion of a total surface of the secondary active-material structures formed by silicon is at least about 50%.

\* \* \* \* \*